July 6, 1965  W. D. APPEL  3,192,551
WINDSHIELD WIPER BLADE ASSEMBLY
Filed Aug. 31, 1964  3 Sheets-Sheet 1
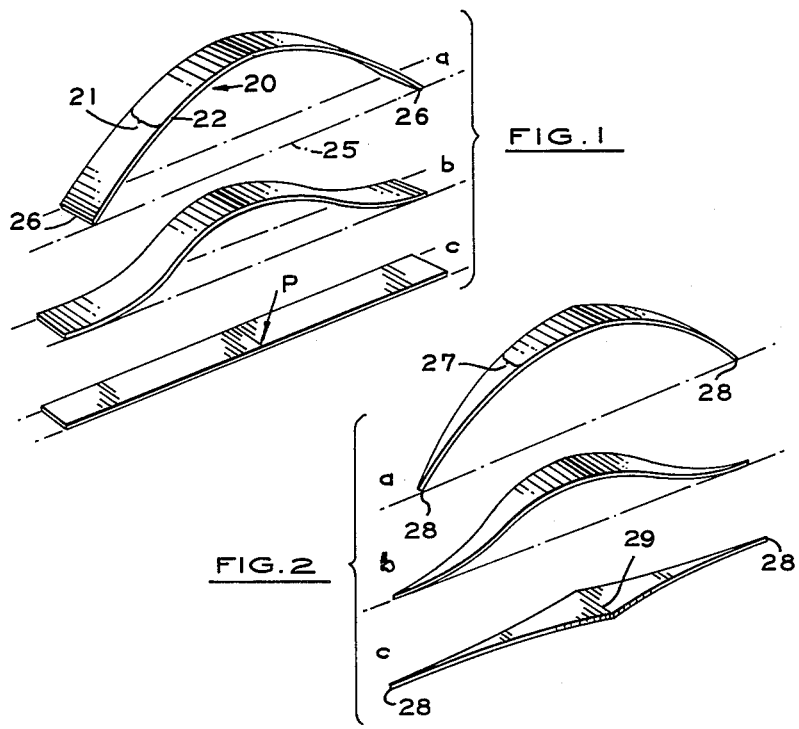
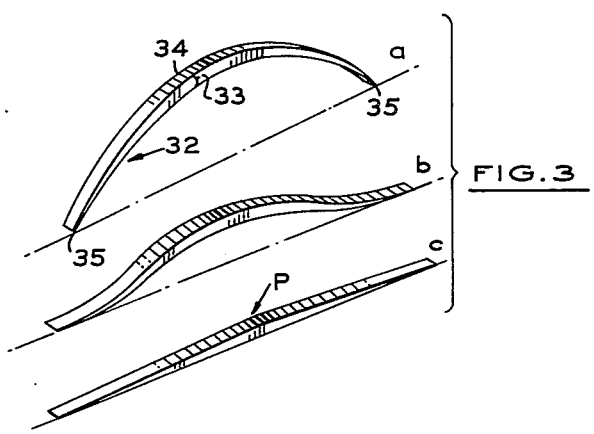
INVENTOR
WALTER D. APPEL
BY
ATTORNEYS July 6, 1965  W. D. APPEL  3,192,551
WINDSHIELD WIPER BLADE ASSEMBLY
Filed Aug. 31, 1964  3 Sheets-Sheet 2
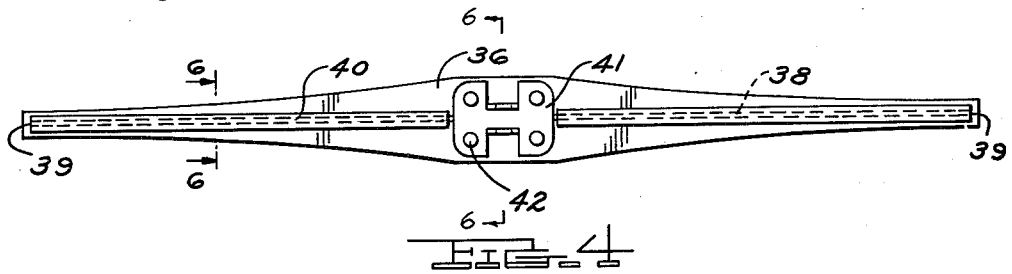
FIG. 4
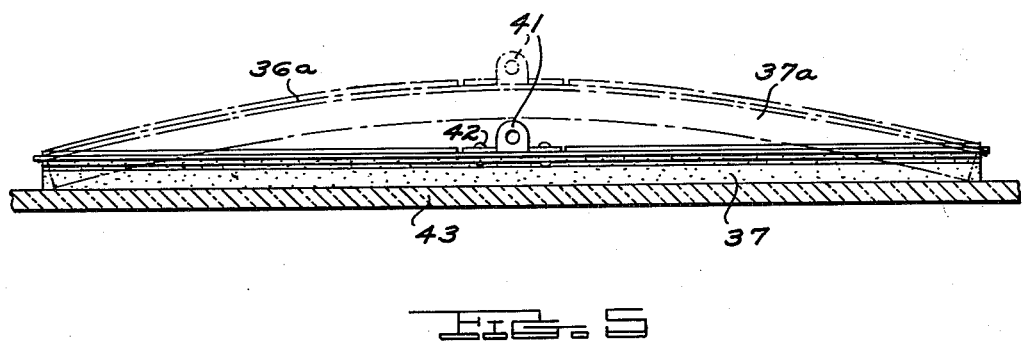
FIG. 5
FIG. 7
FIG. 6
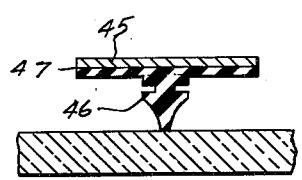
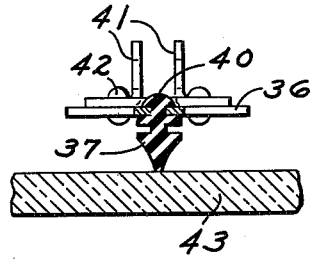
FIG. 8
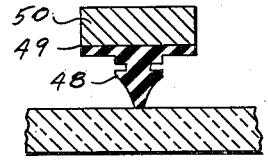
INVENTOR.
WALTER D. APPEL
BY
ATTORNEYS

INVENTOR
WALTER D. APPEL
BY
ATTORNEYS 3,192,551
WINDSHIELD WIPER BLADE ASSEMBLY
Walter D. Appel, 4350 Commerce Road,
Orchard Lake, Mich.
Filed Aug. 31, 1964, Ser. No. 394,386
9 Claims. (Cl. 15—250.36)

The present application is a continuation-in-part of my co-pending application Serial No. 196,254, filed May 21, 1962, now abandoned.

This invention relates to improvements in windshield wiper blade assemblies and more particularly to a simplified spring wiper blade backbone construction flexibly adaptable to efficient wiping of variable curvatures as well as relatively flat portions of vehicle windshields.

The present construction presupposes a wiper actuating arm adapted to provide a pre-determined total resilient pressure-loading of the wiper blade against the windshield surface appropriate to the length of the blade and curvature variations in the windshield, e.g. in the order of one ounce per inch of blade length, as well as an appropriate source of power for actuating the wiper under normal conditions. A single spring element is provided as a backbone to which is mounted a conventional flexible rubber wiping blade which together operate to distribute a centrally applied actuating arm pressure load relatively uniformly along the length of the blade throughout variations in windshield contour traversed by the wiper. Preferably the resilient backbone member is adapted for actuating arm attachment at or near the center and is constructed of spring metal or other resilient material bowed with a free contour surface having a radius of curvature less than that of the windshield traversed by the wiper assembly, together with a varying width and/or thickness of such resilient member from a maximum near the central arm attachment point to a minimum at the ends, the width, thickness and degree of free curvature being proportioned with the modulus of elasticity, total pressure load and length of blade to provide substantially uniform pressure along the length of contact between the flexible rubber wiping blade and the windshield.

In order to meet extreme conditions of variations in windshield curvature it may be desirable in some instances to taper the ends of the spring backbone element in thickness as well as in width in order to accommodate a correspondingly smaller radius of curvature while retaining appropriate width for resisting lateral drag loads without undue distortion.

These and other objects of the invention may best be understood by reference to the drawings illustrating a preferred embodiment wherein:

FIG. 1a is an isometric view of a spring element having uniform width and thickness and a free form parabolic curvature adapted to develop a uniform pressure when pressed against a flat surface;

FIG. 1b is a similar view of such element in a partially flattened condition;

FIG. 1c is a similar view of such element in a fully flattened condition;

FIG. 2a is a similar view of an alternate spring element having a uniform thickness and variable width together with a free form circular arc curvature;

FIGS. 2b and 2c are similar views of such alternate element showing progressive deflection against a flat surface;

FIG. 3a is a similar view of a second alternate construction showing a spring element with uniform width, tapered thickness and a free form circular arc curvature;

FIGS. 3b and 3c are similar views showing the progressive wrapping action of such second alternate spring element when pressed against a flat surface;

FIG. 4 is a plan view of a preferred embodiment of a windshield wiper blade assembly employing a spring backbone element similar to that illustrated in FIGS. 2a–2c;

FIG. 5 is a side elevation of such preferred embodiment;

FIG. 6 is a sectional view taken along the line 6—6 of FIG. 4;

FIG. 7 is a sectional view similar to FIG. 6 showing a modified construction for attachment of a rubber wiping blade;

FIG. 8 is a sectional view similar to FIG. 6 showing a modified construction for attachment of a rubber wiping blade to a spring backbone of the type illustrated in FIGS. 3a–3c;

Figure 9:
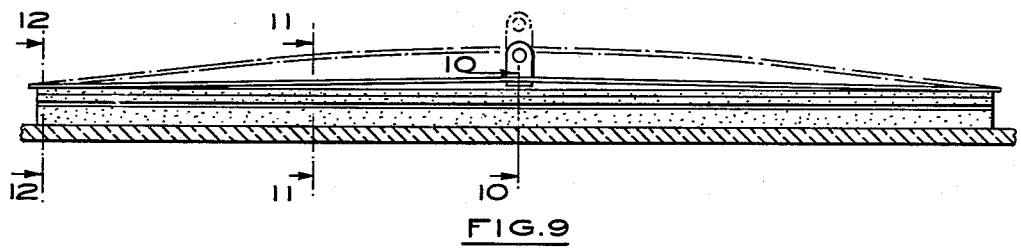
FIG. 9 is a side elevation of a modified embodiment of a windshield wiper blade assembly employing a spring backbone element as shown in FIGS. 10, 11, and 12.
Figure 10:
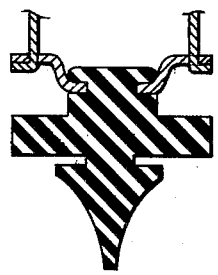
Figure 11:
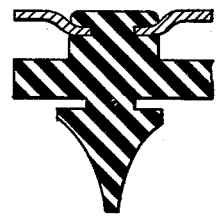
Figure 12:
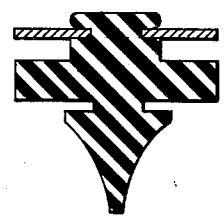
Figure 13:
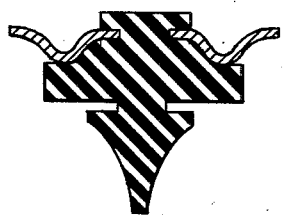
Figure 14:
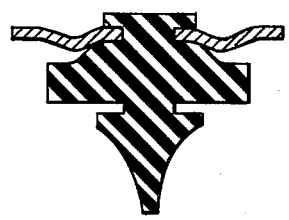
Figure 15:
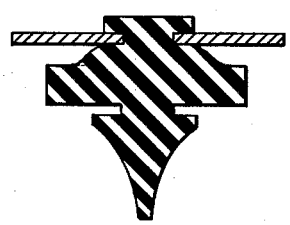

FIGS. 10, 11 and 12 are sectional views taken along corresponding lines in FIG. 9; and FIGS. 13, 14 and 15 are views similar to FIGS. 10, 11 and 12 showing another modification of the spring backbone.

The present approach to providing substantial uniform pressure with a single spring backbone construction may best be understood by first considering the conditions which would produce uniform pressure on a flat windshield surface. With reference to FIGS. 1a–1c uniform pressure loading along the length of a spring 20 having uniform width 21 and uniform thickness 22 could be accomplished by providing an appropriate free state parabolic form having its principal axis normal to the center of the spring such that if moved from a spaced position normally toward a flat windshield surface 25, the ends 26 would make initial contact with progressive "wrapping" of the spring against the windshield from the ends toward the center as shown in FIGS. 1b and 1c as increasing pressure is applied at the center. The parabolic free form required for completely uniform distribution of pressure for a given total central loading P will depend upon the length, thickness, width and modulus of elasticity of the material used. For a given modulus of elasticity, relatively thinner or narrower sections will require relatively greater deflection and deeper free parabolic form to produce a given total uniform pressure loading.

As illustrated in FIGS. 2a–2c, by tapering the spring width 27 from a maximum at the center to a minimum at the ends and making such taper in the form of parabolic arcs having their principal axes normal to the ends 28 of the spring (see also FIG. 4), the free form longitudinal section for producing uniform load distribution can be converted from a parabolic free form having only slight free form curvature at the ends (FIG. 1) to a circular arc of uniform free form curvature which again will "wrap" at a uniform rate from the ends 28 to the center 29 with increasing center pressure loading as shown in FIGS. 2b and 2c, and when fully flattened, the bending stress as well as the unit pressure loading of the spring will be uniform throughout, as distinguished from the previously discussed uniform width parabolic form of spring element where the bending stress is non-uniform and maximum at the center.

With reference to FIGS. 3a–3c, a similar result can be achieved by providing a uniform width 31 of spring 32 which has a uniformly tapered thickness 33 from a maximum at the center 34 to a minimum at each end 35 in which case a circular arc free form longitudinal section will again result in uniformly progressive "wrapping" from the ends to the center with uniform pressure contact loading along the length of the spring from a centrally applied load P as illustrated in FIGS. 3b and 3c. The effect of taper may be simulated by using spring stock of uniform thickness having a reinforcing rib as shown in FIGS. 9–12 or ribs as shown in FIGS. 13–15 of progressively increasing depth from ends to center formed in the center of the spring; or flanges (not shown) of tapering depth may be formed at the edges of the spring to provide progressively increasing resistance to bending from the ends to the center.

Thus a parabolic effect in spring rate leading to progressive "wrapping" from ends to center and uniformity of pressure contact can be achieved through the provision of (1) a parabolic form of free curvature in a spring of uniform section; (2) a parabolic form of width in a spring of uniform thickness and uniform curvature; or (3) a uniformly tapered thickness in a spring of uniform width and uniform curvature. Obviously, it is also possible to combine in a number of different ways these various constructional approaches incorporating progressive dimensional variations in free form curvature, width and/or thickness along its length to provide a single spring backbone element having uniform pressure loading characteristics when pressed against a flat windshield. Whichever construction is used, it is the combination of the flexible rubber wiping blade with the spring backbone element which determines the final pressure characteristic between the wiping blade and the windshield surface. For this reason the shape and section of the flexible rubber wiping blade must also be taken into account with the spring backbone element in determining the proper design proportions.

With whatever specific constructional form is employed it may be adapted to also provide substantially uniform pressure loading on any given *curved* windshield surface by adding to the free form curvature which produces uniform pressure loading on a flat surface the additional curvature of the curved windshield surface. In this manner a single spring may be adapted to provide uniform pressure on any average or extreme curvature surface or intermediate curvature portion of a variable windshield surface. In this connection where a wiper is required to operate over substantially variable curvatures, a fully uniform pressure can be provided for only one specific curvature with a fixed, pre-determined total pressure loading provided by the wiper actuating arm but variations in pressure may be minimized in several ways which will permit the present simplified spring construction to perform a completely satisfactory wiping job. One is to adopt a uniform pressure curve intermediate the extremities of maximum and minimum curvature contours traversed by the wiper; another is to employ a spring material having a high modulus of elasticity and high fatigue strength combined with a relatively light section and high degree of free curvature for the desired total loading so that the "rate" of the spring will be minimal and the variations in curvature of the windshield a minimal fraction of the total deflection. These provisions, together with the resiliency of the rubber wiping blade per se in accommodating itself to some variation in pressure loading, have been found to permit a completely satisfactory and effective wiper to be constructed with the present single spring backbone element, a preferred embodiment of which will now be described.

With reference to FIGS. 4–6 a spring backbone element 36 of the type illustrated in FIGS. 2a–2c may be adapted to carry a conventional rubber wiping blade 37 by providing a slot 38 extending almost throughout the length and terminating just short of the end 39 for accommodating a flanged rib 40 of the rubber blade projecting therethrough. The sides of the backbone may be sprung apart to facilitate attachment of the rubber blade before actuating arm attachment clip 41 is secured thereto by rivets 42 providing a permanent assembly for retaining the rubber blade 37 in position. As shown in FIG. 5 the backbone 36a and rubber blade 37a have a free form circular arc curvature modified at the ends with somewhat less curvature, adapted to provide uniform contact pressure along the length of contact with a flat windshield 43 when fully depressed by the actuating arm (not shown). The reduced curvature at the ends departing from a true circular arc may be required where, as in this embodiment, the parabolic sides terminate at each end with a finite width rather than a point. The theoretically proper curvature at such ends would be intermediate the parabolic curvature shown in FIG. 1 incident to a spring cross section of uniform width and thickness and the circular curvature shown in FIG. 2 incident to parabolic sides meeting at a point at either end; however, as a practical compromise the provision of a circular curvature terminating somewhat short of straight end portions has been found satisfactory due to the ability of the rubber wiper blade to compensate for a limited degree of non-uniform spring load.

FIGURE 7 shows a modification in detailed construction of the rubber wiper blade and attaching means in which a spring backbone element 45 similar to that of FIGS. 4–6 has a modified rubber blade 46 attached by bonding at 47. The modification of FIG. 8 shows a similar modified rubber blade 48 similarly attached by bonding at 49 to a spring backbone 50 of the tapered thickness type shown in FIGS. 3a–3c.

From the above description of a preferred embodiment and certain modifications it will be understood that numerous other modifications might be resorted to without departing from the scope of this invention as defined in the following claims.

I claim:

1. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means.

2. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a varying width providing an increasing spring rate.

3. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from end to center as a predetermined normal pressure loading is gradually applied through said attaching means, said spring backbone element having a varying effective thickness providing an increasing spring rate.

4. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring rate increasing as a greater than linear function of distance inwardly toward the center.

5. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a spring rate increasing approximately as the square of the distance inwardly toward the center.

6. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a varying width of section defined by substantially parabolic edge curvature providing a spring rate increasing approximately as the square of the distance inwardly toward the center.

7. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a varying thickness of section defined by substantially uniform linear taper providing a spring rate increasing approximately as the square of the distance inwardly toward the center.

8. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a rib of varying depth providing a spring rate increasing approximately as the square of the distance inwardly toward the center.

9. A windshield wiper blade assembly including a wiper element, a flexible spring backbone element connected to the wiper element, attaching means adjacent the center of said backbone element, said backbone element having coordinated length, section width, thickness, modulus of elasticity and free form longitudinal curvature exceeding any subtended windshield curvature and including progressive dimensional variations providing a parabolic effect in spring rate normal to the windshield surface adapted in engagement in a normal direction against a predetermined windshield surface to make progressive "wrapping" pressure contact from ends to center as a predetermined normal pressure loading is gradually applied through said attaching means, said spring backbone element having a pair of ribs of varying depth providing a spring rate increasing approximately as the square of the distance inwardly toward the center.

References Cited by the Examiner

UNITED STATES PATENTS

| 2,254,343 | 9/41 | Zierer | 15—250.23 |
| 2,589,339 | 3/52 | Carson | 15—250.40 |
| 2,654,597 | 10/53 | Barenyi | 267—47 |
| 3,029,460 | 4/62 | Hoyler | 15—250.42 |

FOREIGN PATENTS

| 427,383 | 4/35 | Great Britain. |
| 619,320 | 5/48 | Great Britain. |
| 785,865 | 11/57 | Great Britain. |
| 820,156 | 7/37 | France. |

CHARLES A. WILLMUTH, *Primary Examiner.*